(12) United States Patent
Kroie (10) Patent No.: US 6,834,468 B1
(45) Date of Patent: Dec. 28, 2004

(54) PAPER COATED METAL BUILDING PANEL AND COMPOSITE PANELS USING SAME

(75) Inventor: Robert Kroie, Lindfield (AU)

(73) Assignee: Unipanel Pty Ltd., Seven Hills (AU)

( * ) Notice: Subject to any disclaimer, the term of this patent is extended or adjusted under 35 U.S.C. 154(b) by 0 days.

(21) Appl. No.: 09/673,001

(22) PCT Filed: Apr. 9, 1999

(86) PCT No.: PCT/AU99/00264

§ 371 (c)(1),
(2), (4) Date: Oct. 6, 2000

(87) PCT Pub. No.: WO99/53155

PCT Pub. Date: Oct. 21, 1999

(30) Foreign Application Priority Data

Apr. 9, 1998 (AU) .............................................. PP2898

(51) Int. Cl.[7] .............................. E04B 2/08; E04B 2/18; E04B 2/32; E04B 2/46
(52) U.S. Cl. .................... 52/590.2; 52/783.1; 52/794.1; 52/309.9; 52/578
(58) Field of Search ........................... 52/590.2, 783.1, 52/588.1, 794.1, 309.9, 309.11, 578, 579, 582.1, 580

(56) References Cited

U.S. PATENT DOCUMENTS

| | | | | |
|---|---|---|---|---|
| 1,697,189 A | * | 1/1929 | Kirk | 52/278 |
| 1,914,345 A | * | 6/1933 | Roos | 52/408 |
| 2,006,232 A | * | 6/1935 | Upson | 428/138 |
| 2,192,653 A | * | 3/1940 | Schenk | 52/145 |
| 2,406,448 A | * | 8/1946 | Wheat | 52/580 |
| 2,850,999 A | | 9/1958 | Kaplan et al. | |
| 3,017,672 A | * | 1/1962 | Vaughan | 20/4 |
| 3,300,899 A | * | 1/1967 | Haws | 49/321 |
| 3,386,218 A | * | 6/1968 | Scott | 52/309 |
| 3,654,067 A | * | 4/1972 | Klien | 428/448 |
| 3,667,180 A | | 6/1972 | Tischuk | |
| 3,760,548 A | * | 9/1973 | Sauer et al. | 52/592.1 |
| 3,950,910 A | * | 4/1976 | Pobanz | 52/783.11 |
| 3,975,882 A | * | 8/1976 | Walter | 52/571 |
| 4,186,539 A | * | 2/1980 | Harmon et al. | 52/580 |
| 4,201,020 A | * | 5/1980 | Saunders | 52/580 |

(List continued on next page.)

FOREIGN PATENT DOCUMENTS

| | | |
|---|---|---|
| AU | 41506/78 | 5/1980 |
| DE | 647272 B | 7/1937 |
| DE | 2449917 A | 4/1976 |
| DE | 26 11 893 A1 | 9/1977 |
| EP | 0 250 258 A1 | 12/1987 |
| FR | 1133582 | 3/1957 |
| FR | 2 694 774 | 2/1994 |
| GB | 391936 | 6/1933 |
| GB | 1482111 | 8/1977 |
| JP | 2000351177 | * 12/2000 |
| JP | 2001009969 | * 1/2001 |
| WO | WO 93/12303 | 6/1993 |

OTHER PUBLICATIONS

Derwent Abstract Accession No. 11966W/07, JP 75001912 B (Daido Steel Sheet Mfg. Co.) Jan. 22, 1975 (abstract).
Derwent Abstract Accession No. 90–221720/29, JP 02151440 A (Fuji Kobunshi KK) Jun. 11, 1990 (abstract).

*Primary Examiner*—Carl D. Friedman
*Assistant Examiner*—Chi Q. Nguyen
(74) *Attorney, Agent, or Firm*—Nixon Peabody LLP (57) ABSTRACT

A building panel 20 is disclosed which is of sandwich construction having metal sheet structures 21, 22 interconnected by a core 23. The panel 20 includes profiled edge regions 24, 25 enabling the panel to interlock with a like panel. In one form a paper covering 27 is bonded to the metal sheet structure so that panel has a surface characteristic similar to that of plasterboard. A reinforcing element 40 is also disclosed which is arranged to be connected at the joint between abutting panels to improve the load bearing capacity of the panel 20.

32 Claims, 9 Drawing Sheets

U.S. PATENT DOCUMENTS

| | | | | |
|---|---|---|---|---|
| 4,304,083 A | * | 12/1981 | Anderson | 52/509 |
| 4,316,351 A | | 2/1982 | Ting | |
| 4,711,682 A | * | 12/1987 | Barbe et al. | 156/71 |
| 4,744,185 A | * | 5/1988 | Lamberet et al. | 52/309.11 |
| 4,918,895 A | * | 4/1990 | Landheer | 52/580 |
| 4,937,125 A | * | 6/1990 | Sanmartin et al. | 428/116 |
| 5,228,257 A | * | 7/1993 | Bowersox et al. | 52/588.1 |
| 5,274,979 A | * | 1/1994 | Tsai | 52/588.1 |
| 5,293,728 A | * | 3/1994 | Christopher et al. | 52/588.1 |
| 5,348,778 A | * | 9/1994 | Knipp et al. | 428/35.8 |
| 5,373,678 A | * | 12/1994 | Hesser | 52/592.1 |
| 5,425,210 A | * | 6/1995 | Zafir | 52/404.4 |
| 5,536,778 A | * | 7/1996 | Kreckel et al. | 524/13 |
| 5,592,794 A | * | 1/1997 | Tundaun | 52/220.7 |
| 5,725,201 A | * | 3/1998 | Parth | 52/588.1 |
| 5,749,197 A | * | 5/1998 | Jolly | 52/584.1 |
| 5,842,545 A | * | 12/1998 | Blaiotta | 187/401 |
| 5,860,693 A | * | 1/1999 | Ehrlich | 296/191 |
| 5,927,032 A | * | 7/1999 | Record | 52/309.11 |
| 5,938,274 A | * | 8/1999 | Ehrlich | 296/191 |
| 6,277,468 B1 | * | 8/2001 | Nakamoto et al. | 428/156 |
| 6,314,701 B1 | * | 11/2001 | Meyerson | 52/588.1 |
| 6,385,942 B1 | * | 5/2002 | Grossman et al. | 52/798.1 |

* cited by examiner

PAPER COATED METAL BUILDING PANEL AND COMPOSITE PANELS USING SAME

This application is a U.S. patent application filed under 35 U.S.C. 371, based on PCT International Application No. PCT/AU99/00264, filed Apr. 9, 1999, which claims priority to Australian Patent Application No. PP 2898, filed Apr. 9, 1998.

FIELD OF THE INVENTION

The present invention relates to a building panel. One aspect of the invention has been developed especially, but not exclusively for use in interior wall or ceiling panelling, and the invention is herein described in that context. However it is to be appreciated that the invention has broader application and is not limited to these uses. In particular, another aspect of the invention is especially suited for use in flooring or the like.

BACKGROUND OF THE INVENTION

In the building industry, panels are widely used in interior walls, partitions and ceilings. One of the most common type of panelling used is plasterboard, which traditionally is formed from a core of gypsum or anhydrite plaster faced with two sheets of heavy paper. Plasterboard has gained widespread acceptance because it is inexpensive, relatively light weight, can be easily cut and provides a good surface finish.

However, there are significant problems with plasterboard. Traditional plasterboard panels are not self supporting and need to be fixed to a supporting frame such as a stud wall or the like. This substantially increases the cost of installation. Furthermore, plasterboard has relatively poor thermal and acoustic insulation properties as compared to block walls, and is relatively inflexible thereby making it difficult to form into complex shapes.

Various proposals have been made to address these problems. These include the development of hollow core reinforced plaster panels or prefabricated sandwich panels made from two sheets of plasterboard bonded to a paper honeycomb core. Whist such designs are self supporting, they have limited applications and have not gained widespread acceptance.

SUMMARY OF THE INVENTION

An aim of a first aspect of the present invention is to provide a building panel which is similar to traditional plasterboard panels in both terms of its costs and surface characteristics, yet which is able to provide significant improvements in respect of its structural properties.

According to this aspect of the present invention, there is provided a building panel including a metal sheet substrate and a paper covering bonded to said substrate, wherein said paper covered metal sheet forms a major surface of the panel and wherein said metal sheet includes opposite edges which are shaped to form edge regions of the panel, each edge region being formed to include a connecting element which extends along that edge region and which allows for interconnection of the panel with a like panel, one connecting element being formed as a channel and the other formed as a projection, the projection of one edge region being configured to interfit within the channel of the other edge region of a like panel to form a load bearing region capable of accommodating loading applied to said interconnected panels, and wherein when interconnected, the major surfaces of the interconnected panels are aligned and generally in abutting relationship to form a substantially continuous exposed surface.

The panel according to this aspect of the present invention provides significant advantages over the plasterboard panels. The panel of the invention with its paper covering, has a surface characteristic which can match that of plasterboard, yet offers significant improvements in structural properties because of the metal substrate. For example, the panel may be load bearing, may be formed or otherwise shaped into complex configurations, and is able to exhibit improved thermal and acoustic insulation characteristics.

A particular advantage of the panel is that the surface of a wall formed from the panels can be finished to appear continuous using standard techniques used on plasterboard walls. Such techniques include plaster rendering and the use of plaster tape.

Throughout the specification the term "paper" includes sheet material formed from any fibrous material produced from either naturally occurring or synthetic fibres. The sheet material may be of unitary or composite construction. It also includes other types of sheet material which have characteristics, in particular surface texture, which are similar to paper.

In a particularly preferred form, the panel of the invention is formed in continuous lengths using a laminating process to adhere the paper covering to the metal substrate. The production of panels in this way provides significant cost benefit and also has the advantage of enabling panels of indefinite length to be produced.

Preferably the building panel includes a generally planar abutment surface at each longitudinal edge region which extends generally perpendicular to the major surface. Preferably the connecting elements are disposed inwardly of the major surface with the abutment surfaces being disposed between the major surface and the connecting elements. This arrangement is ideally suited where the paper covering gives the panel a surface characteristic which is substantially the same as a plasterboard panel. In that arrangement, the panel is operative to form a substantially continuous exposed surface by connection of the panel with a like panel through interfitting of respective ones of the connecting elements, or through abutting of an edge of a plasterboard against a respective one of the abutment surfaces.

The profiles may be formed in the panel using any known technique such as roll forming, folding or the like. However in a particularly preferred form, the panels are roll formed to the desired profile. In this way this forming step can be easily included as an extension to the laminating process.

Any appropriate sheet metal may be used as the substrate, such as steel, aluminium, tin or the like. In general construction, galvanised steel has wide application as the metal substrate as it is relatively inexpensive, has good structural properties and is corrosive resistant. The gauge of the metal substrate may be chosen depending on the required structural properties of the panel. However it is envisaged that the gauge will be between 0.3 to 1 mm in most applications. Metal falling within this range of thicknesses can easily be cut thereby enabling services to be easily installed in the panel on site.

In a particularly preferred form, the panel is bonded directly to the metal surface. Preferably a reactive hot melt adhesive is used to bond the paper to the metal substrate. An advantage of using a reactive hot melt adhesive is that it provides high bond strength including high initial adhesive and cohesive strength which makes it ideal for laminating the paper directly onto the bare metal substrate. The ability to bond the paper directly onto a metal substrate again provides significant cost benefit in that it avoids the need for pretreatment of the metal such as the application of a primer coat to the metal surface. However, it is to be appreciated that intermediate layers such as paint or waterproof coatings may be included between the metal substrate and the paper covering if required.

In a preferred form, the adhesive is applied by a roller to the metal surface, as this gives good even coverage of the adhesive across the substrate surface which is important for providing an even surface finish on the panel.

The building panel of the invention has widespread application and can be used instead of, or in conjunction with, traditional paneling such as plasterboard. For example, the paneling of the invention may be used as a fascia, a ceiling panel or the like. In addition it may be used in conjunction with a traditional plasterboard partition or wall. For example, the panel may be included in a section of a plasterboard wall where a complex surface, such as a curved wall, is required which could not be formed using conventional plasterboard.

The building panel may also incorporate additional layers to improve its structural properties. For example, the panel may include additional insulating or thermal layers bonded to the metal substrate on the opposite surface to the paper covering. Again these additional layers may be bonded using any known technique but are preferably applied using a laminating process so as to be easily incorporated in the overall forming process of the panel.

In a particularly preferred form, the building panel is incorporated as part of an integrated structural or composite panel. In this arrangement, the composite panel includes spaced sheet structures which are interconnected by a core and wherein at least one of the sheet structures includes a building panel as described above with the paper covering forming an outer surface of the composite panel.

A composite panel according to this arrangement has widespread application for use as interior walls or partitions. The composite panel is self supporting, is able to be configured to be load bearing and can incorporate profiled edge regions to enable the panel to be interlocked with adjacent panels.

In a preferred form, both the sheet structures of the panel are formed at least partially from a metal sheet. If only one side of the panel is to be exposed, then only the exposed face need include the covering; the other face may remain bare metal. If both sides are to be viewed then both faces can include the paper covering. Alternatively, if required, different surface finishes may be used. For example, one surface may include a plastic or similar water impermeable covering for use in a bathroom or the like while the other face may include the paper covering. If required, one face may include a decorative surface such as a timber veneer or the like.

A particular advantage of using metal sheet as part of the composite panel is that the longitudinal edges can be formed so as to enable the panel to interlock with adjacent panels thereby facilitating the construction of a wall using the structural panels. The profile of the longitudinal edges of the composite panel may be such that no additional fasteners are required. Alternatively, the edge profiles may be designed solely to align the adjacent panels and mechanical fasteners such a rivets, screws or inserts are used to fasten the panels together.

In one form, the panels are installed using top and bottom rails. The rails may have a simple C-shaped cross section. In this arrangement, the depth of the rails, the distance they are spaced apart, and the height of the panel is related so that the panels may be easily installed by merely locating the upper end of the panel into the top rail and then swinging the bottom end of the panel into alignment with the bottom rail and then dropping the panel down into the bottom rail. The panel is then captured between the top and bottom rails and may be secured in place by fasteners, such as rivets or self tapping screws or the like. It is to be appreciated that other fastening arrangements may be used. For example the rails may be specially formed so that they interlock with the panels without the need for separate fasteners.

The core of the composite panel may be of any suitable form depending on its application or requirements. In particular, the core may be of solid construction of may be of open form including interconnecting webs to thereby form cavities within the core. These cavities may be used to reduce the weight of the integrated panel or to provide passage for services such as wiring and the like.

In one form, the edge profiles are shaped to form a slip joint at the interlock between the adjacent panels. In this arrangement, one edge profile forms the male component of the slip joint where as the edge profile of the other panel forms a complimentary female component of the joint. In a particularly preferred form, the panels are arranged to interlock in a snap fit manner so as to facilitate proper engagement of the panels and to resist inadvertent separation.

In another form, the edge profiles are specifically designed to form a load bearing member at the interlock between adjacent panels. In a preferred form, the interlock is still by virtue of a male/female coupling but the edge profiles are shaped to form a part box section. The section has inherent strength and also is convenient for use in the passage of cabling or other services. Moreover, the male coupling may be arranged to be drawn into tight engagement with the female coupling so that the overlapping structure of the male and female connection acts in unison thereby increasing the load bearing capability of the panels.

In one form, the composite panel is designed to be able to receive a structural member which acts as a reinforcing element between its sheet structures. The reinforcing element improves the load bearing capability of the panel and preferably comprises a metal beam.

In a particularly preferred form, the edge profiles are designed to be able to receive the reinforcing element so that the reinforcing element is contained within the connection between the adjacent panels and is fully concealed. In this way, a wall formed from the panels may be continuous across the joint which contains the reinforcing element.

In a further arrangement, the edge profiles are formed separate to the panel and are arranged to be located over, and secured to, the edge margins of the panels which are typically unformed. This arrangement enables use of a composite panel with straight edges. Alternatively, the separate edge profiles may be used as an accessory to the building system incorporating the composite panels with the profiled edges. For example, the edge profiles may be used when it is required to cut the composite panel or when the composite panel is required to interfit with conventional panels or other building members.

In a further aspect, the present invention relates to a building system which has enhanced load bearing capabilities.

According to this aspect, the present invention provides a building system including a building panel and a reinforcing element, the building panel having spaced metal sheets interconnected by a core, said metal sheets defining opposite major surfaces of said panel, each of said metal sheets including opposite edge regions which form longitudinal edge regions of the panel, wherein at least one of the edge regions of the metal sheets on both opposite sides of the panel is profiled to form connecting elements, the connecting elements of the longitudinal edge regions of the panel being adapted to interfit with the connecting element of a respective one of the longitudinal edge regions of a like panel, the panel being configured such that the major surfaces of the interconnected panels are aligned and in substantially abutting relationship to form a substantially continuous surface and wherein the reinforcing element is operative to be installed at the joint formed on connection of the panel with a like panel and is secured in place by locating between the interfitting connecting elements to form a concealed reinforcing element which is operative to improve the load bearing characteristics of the interconnected panels.

Preferably the sheet structures are formed of metal and at least one of the sheet structures may be in accordance with an earlier aspect of the invention and incorporate a paper covering. Alternatively, the metal sheet structures may be fully exposed such as if a stainless steel surface is required, or other finishes or composite materials may be used.

The advantage of this aspect of the invention is that it provides a building panel with enhanced load bearing properties as compared to simple sandwich panels. Further, fully concealing the reinforcing element enables continuous smooth surfaces on both sides of the panels to be obtained.

A panel in accordance with this aspect of the invention is suitable for use both as wall panels or ceiling or floor paneling.

In a particularly preferred form, the sheet structure includes longitudinal edge regions which are profiled to enable the panels to be connected in abutting relationship with a like panel in edge to edge relationship and the reinforcing element is locatable within the joint formed at the abutting panels.

In a particularly preferred form, the panel is arranged to interlock with a like panel at the longitudinal edge regions. Preferably the longitudinal edge regions interlock with the reinforcing element. This arrangement has the advantage that if further increases the load bearing capability of the panel as the reinforcing element and the profiled longitudinal edge regions can work together.

It is convenient to hereinafter describe embodiments of the present invention with reference to the accompanying drawings. It is to be appreciated however that the particularity of the drawings and the related description is to be understood as not limiting the preceding broad description of the invention.

DETAILED DESCRIPTION OF THE INVENTION

Figure 1:
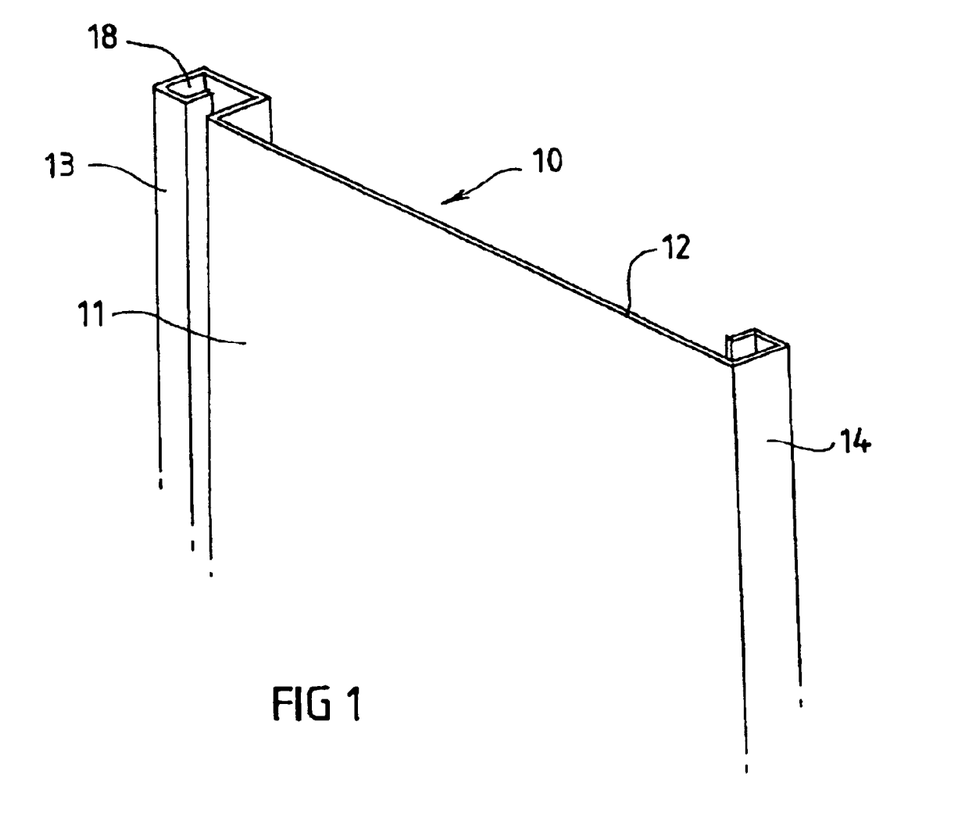
FIG. 1 is a perspective view of a panel according to an embodiment of the invention.

FIG. 1 illustrates a building panel 10 which is generally planar and includes opposite major surfaces 11 and 12 interconnected by edge regions 13 and 14.

The panel 10 is of composite material and formed from a laminating process which forms the panel in continuous lengths. The panel may be of any desired width, although if made from one sheet, the width will be limited by the width of the feed stock. In one form, the panel is formed in standard widths of 1200 mm, 900 mm, 600 mm and 300 mm.

Figure 1A:
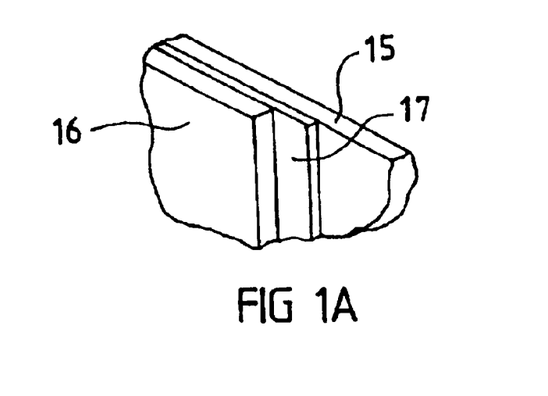
FIG. 1A is a detailed view to an enlarged scale illustrating the construction of the panel of FIG. 1.

The panel includes a metal substrate 15 and a paper covering 16 which is bonded to the substrate 15 by a reactive hot melt adhesive 17. The covering 16 constitutes a heavy plasterboard paper so that the outer face 11 of the panel has the same general appearance and surface characteristics of a plasterboard panel. In the illustrated form, the substrate 15 is formed of galvanised steel thereby enabling the inner surface 12, which in use is concealed, to remain exposed due to its corrosive resistant properties.

The edge regions 13 and 14 of the panel are profiled so as to enable the panel 10 to be connected at these edge regions to a like panel. In the illustrated form, the profiles on the edge regions 13 and 14 are formed by roll forming the metal substrate 13. The edge regions 13 and 14 are formed with one edge region 13 forming a female coupling which is adapted to receive and contain the other edge region 14 which is formed as a male coupling. With this arrangement, the male edge region 14 locates in and is retained within a seat 18 formed within the female edge region 13 of a like panel so that the adjacent panels can be interconnected along their edge regions.

It is to be appreciated that the profiles formed in the edge regions 13 and 14 may take different embodiments as will be appreciated to those skilled in the art of roll forming techniques. Specifically, the profiles can be matched to suit the particular requirements of the panel and the mode of connection required between adjacent panels. For instance, the profiles may be designed such as those illustrated, to not require the addition of any mechanical fasteners to interconnect like panels together. Alternatively the edge regions could be formed so as to provide formations to receive specific mechanical fasteners such as rivets or screws or the like.

Figure 2:
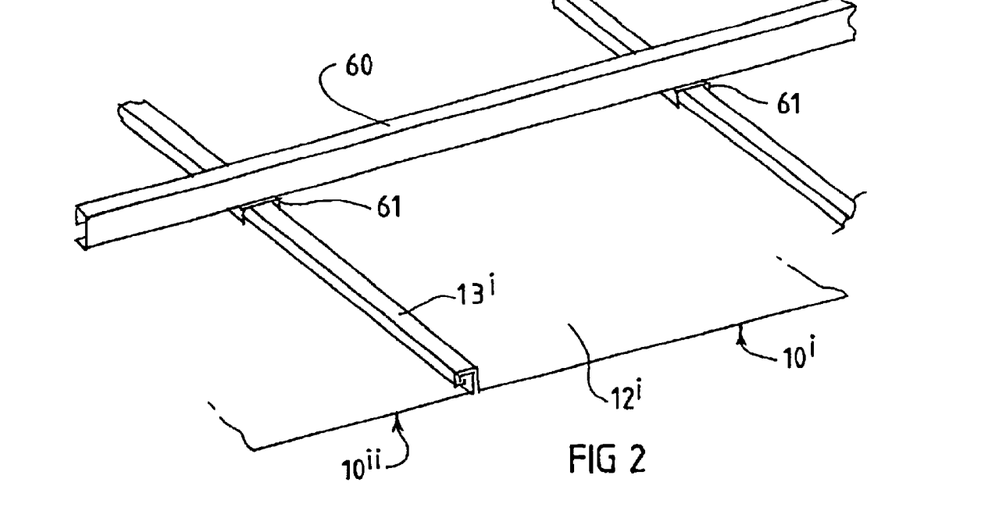
FIG. 2 is a perspective view illustrating the panel of FIG. 1 used as a ceiling panel when in position.

FIG. 2 illustrates the panel 10 in place as part of a ceiling with the panel 10 aligned, and fixed to, the underside of parallel roof batons 60. In the illustrated form, the batons incorporate clips which are adapted to engage and hold the edge regions 13 and 14 of the panels. In this arrangement, the ceiling panels are installed progressively across the baton. A first panel 10$^i$ is installed and fastened to the clips 61. A second panel 10$^{ii}$ is then installed by locating the male edge region 14$^{ii}$ within the female edge region 13$^i$ of the affixed panel 10$^i$ whilst the panel 10$^{ii}$ is inclined relative to the fixed panel 10$^i$. Once located in place, the panel 10$^{ii}$ is then swung up into alignment with the panel 10$^i$ wherein its female edge region 13$^i$ engages with associated clips 61 attached to the batons. The process then continues until all the panels are in place.

With this arrangement, the fixed panels 10 have respective outer faces which incorporate the plasterboard paper covering and thereby have a general appearance of plasterboard. If required, edge trim (not shown) can be inserted between the adjacent panels. Typically the panels would include a bead or similar protrusion which locates within an associated groove (not shown) formed in the edge regions 13 and 14 of the respective panels. Alternatively, the joint between the panels could be concealed so that the ceiling surface is continuous using standard finishing techniques such as plaster rendering or the like.

Figures 3, 3A:
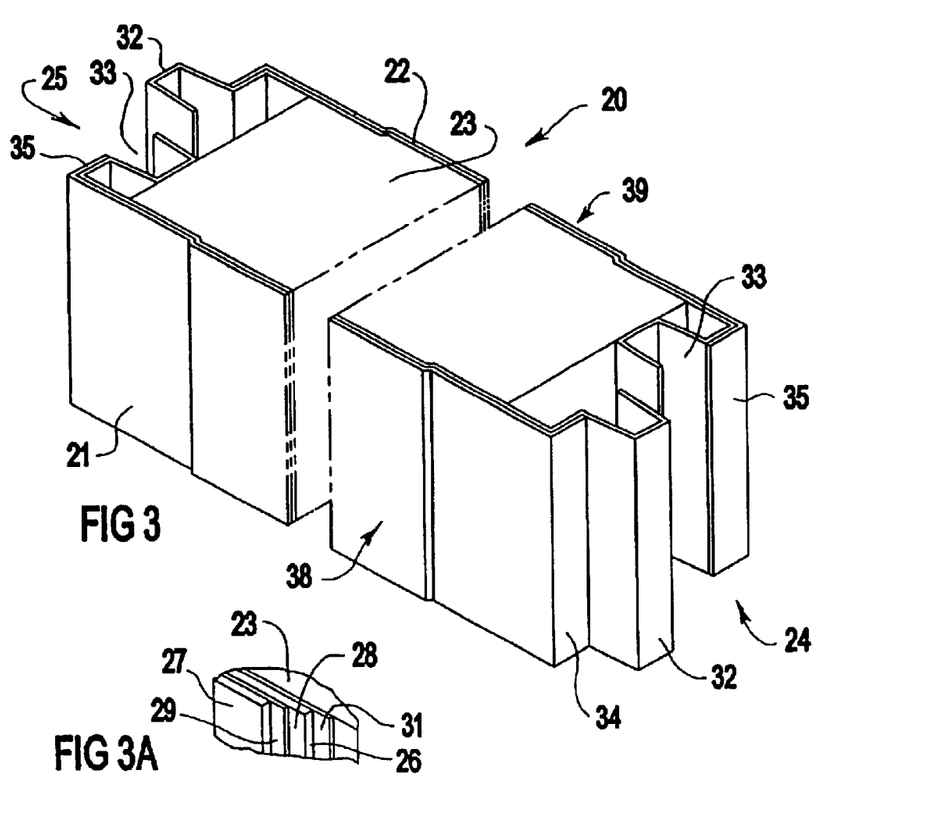
FIG. 3 is a perspective view of a composite panel according to an embodiment of the invention.
FIG. 3A is a detailed view to an enlarged scale illustrating the construction of the panel of FIG. 3.

FIG. 3 illustrates a building panel 20 according to a second embodiment of the invention. The panel 20 is of sandwich construction incorporating first and second spaced structures 21 and 22 respectively, which are interconnected by a core 23. The panel 20 further includes edge regions 24 and 25 which are profiled to enable the panel 20 to be interconnected to a like panel.

As best illustrated in FIG. 3A, each of the sheet structures 21 and 22 incorporate a structure which is similar to the panel 10 illustrated above. Specifically the panels 21 and 22 incorporate a metal sheet substrate 26 which includes a covering 27 formed from heavy plasterboard paper which is bonded to an outer surface 28 of the metal substrate 26 by a reactive hot melt adhesive 29. Similarly, an inner face 30 of the metal substrate 26 is bonded to the core 23 by a similar adhesive 31. The longitudinal edge regions 24 and 25 are profiled by roll forming the respective edge regions of the metal substrates 26 of the respective sheet structures 22 and 21.

The core 23 of the panel is illustrated as a foam block. However it is to be appreciated that the core may be formed of any suitable structure depending on the application of the panel 20. For example, the core may be formed from a composite construction and/or may include cavities or channels if desired.

In a similar manner to the earlier described embodiment, the panel 20 is formed from a laminating process. Typically the sheet structures 21 and 22 are formed in a first laminating process. The sheet structures then form part of a second laminating process where they are bonded to the core. If desired, additional layers can be bonded to the panels to further improve the structural properties of the panel 20. For example additional layers may be incorporated to further increase the thermal or acoustic insulation properties of the panel. By virtue of the laminating process, the panels 20 are formed in continuous lengths and are typically formed in a range of standard widths such as 1200 mm, 900 mm, 600 mm and 300 mm.

The panel 20 has the general appearance and surface characteristics of plasterboard by virtue of the heavy paper covering 27. However because of its sandwich construction and sheet metal substrate, the panel 20 is lightweight, yet is self supporting and capable of acting as a load bearing member.

The edge region 24 of the panel 20 is roll formed to include a longitudinally extending projection 32 and recess 33 which are located intermediate the opposite faces 38, 39 of the panel 20. In the illustrated form, the projection 32 is formed from roll forming the edge of the structure 21 whereas the recess is formed from roll forming the edge region of the structure 22. An abutment face 34 is located between the face 38 and projection 32 and a similar abutment face 35 is formed between the recess 33 and the face 39.

Both the projection 32 and the recess 33 are shaped to be complementary such that the projection 32 is able to be received within the recess 33 of a like panel. To facilitate interconnection of adjacent panels, both the projections and the recesses include tapered surfaces to provide adequate lead in.

The other longitudinal edge region 25 of the panel 20 includes a similar edge profile and includes both a recess 32 and a projection 33, with the exception that the projection is formed from roll forming the edge of the sheet structure 22 whereas the recess 33 is formed from roll forming the edge region 21.

Figure 9A:
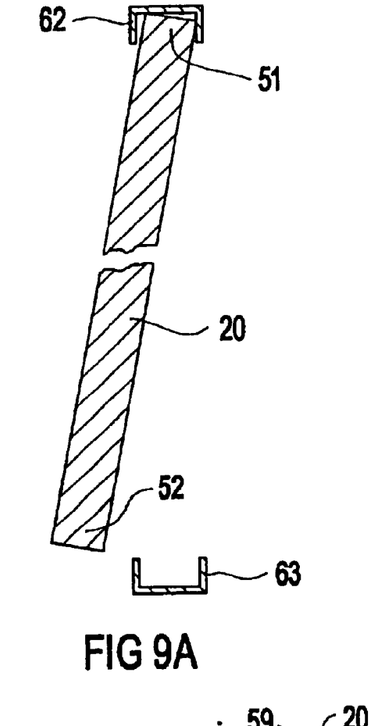
FIGS. 9A and 9B are schematic side views showing installation of the panel into top and bottom rails.
Figure 9B:
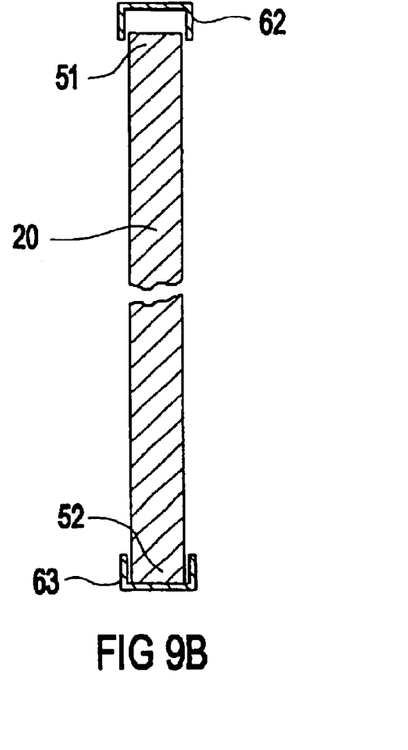

The panel 20 is arranged to be self supporting and typically arranged to be installed between top and bottom rails (62 63) which are formed as C-shaped channels or the like. FIGS. 9A and 9B illustrate the installation of the panel 20 between the rails 62 and 63. The panels are easily installed by merely locating the upper end 51 of the panel into the top rail 62 and then swinging the bottom end 52 into alignment with the bottom rail 63 and then dropping the bottom panel 20 into the bottom rail. The relationship of the distance between the panels to the height of the panel is such that the panel remains captured between the top and bottom rails as best illustrated in FIG. 9B. Once in this position, the panels can then be interlocked with a like panel as will be described in more detail below. Once fully in position the panel are then secured in place to the rails merely by the use of fasteners, such as rivets or self tapping screws or the like.

Figure 4:
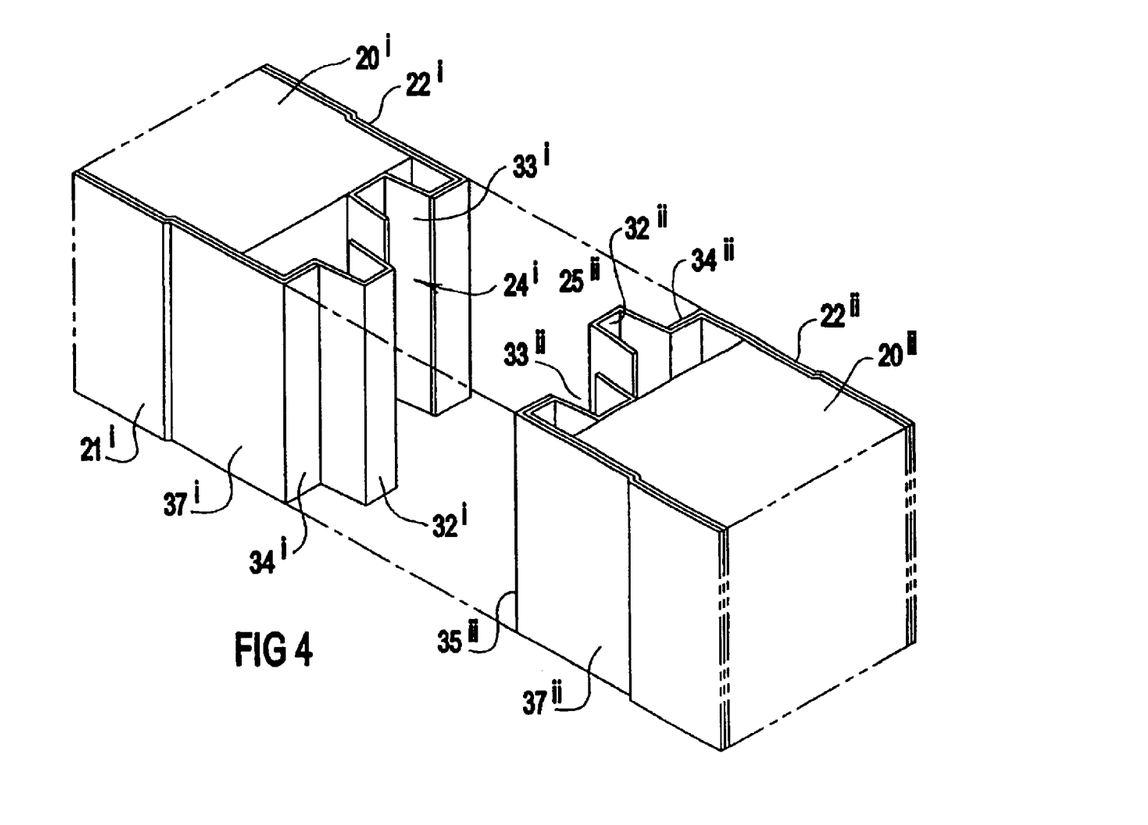
FIG. 4 is an exploded perspective view illustrating the connection of the panel of FIG. 3 with a like panel.
Figure 5:
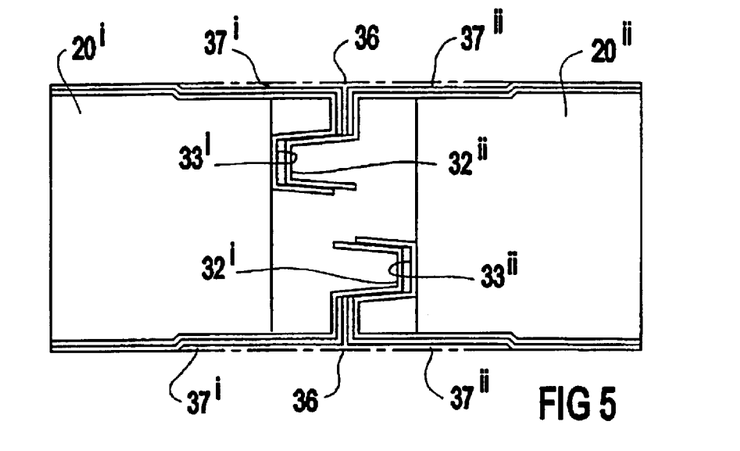
FIG. 5 is a cross sectional view of the connection of the panel of FIG. 3 with a like panel.

FIGS. 4 and 5 illustrate the connection of the panel 20 with a like panel. For ease of identification, one panel is designated 20$^i$ whereas the other panel is designated 20$^{ii}$. Other features of the panels are distinguished in a similar manner.

As best illustrated in FIG. 5, the edge regions 24$^i$ and 25$^{ii}$ enable two panels 20$^i$ 20$^{ii}$ to be connected in edge to edge relationship with the respective projections and recesses of the edge region 24$^i$ engaging with the respective projections and recesses of the edge region 25$^{ii}$ of adjacent panel 20$^{ii}$. Furthermore, the abutment surfaces 34$^i$ and 35$^{ii}$ engage so as to form a simple linear join 36 between the abutting panels 20$^i$ and 20$^{ii}$.

In the illustrated form, both the longitudinal edge regions 24 and 25 of the panel is slightly waisted to form a recessed portion 37 in the outer surface of both the structures 21 and 22. This recess is designed to enable the joint 36 between adjacent panels to be easily covered over by plaster tape or plaster rendering which will be applied within the recess and create a flush surface across the joint The profile of the edge regions 24 and 25 also enables the panel 20 to be easily used in conjunction with standard plasterboard panels. Specifically, the abutment surfaces 34 and 35 provide a space to enable a plasterboard panel to be located in abutting relationship with the panel 20. The abutment surfaces 34 and 35 are dimentioned to be slightly larger than a standard plasterboard panel which is typically 10 mm or 13 mm, so as to provide adequate clearance for the plasterboard panel to be located outside the projection 32 and the recess 33 so that the plasterboard surface can be flush with the respective faces 38 and 39 of the panel 20.

Figure 6:
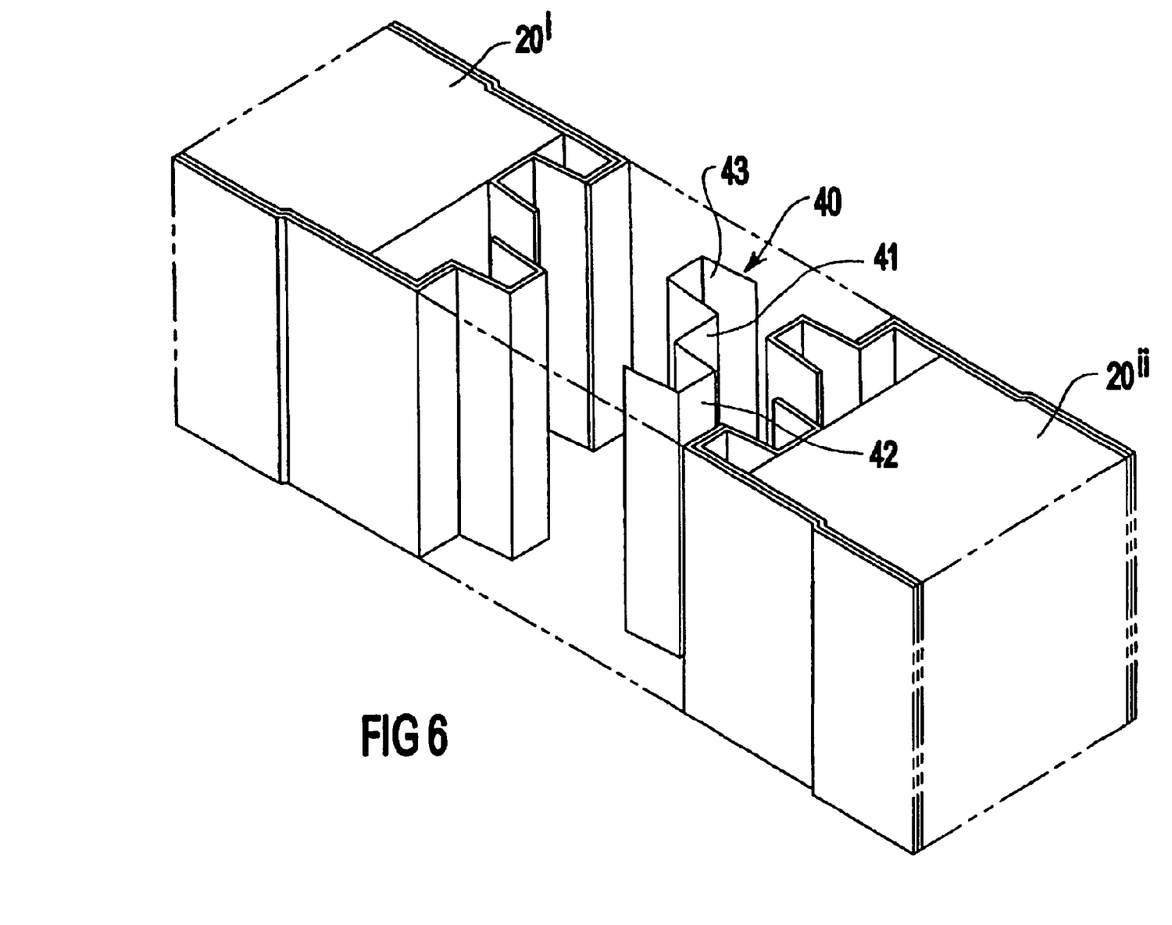
FIG. 6 is a perspective view illustrating the connection of a variation of the panel of FIG. 3 with a like panel and including an intermediate reinforcing element.

The coupling arrangement to join adjacent panels using the interfitting projections and recesses 32 and 33 provide an area of load bearing strength at the engaged edge regions. This has significant advantage as it improves the load bearing characteristics of the wall formed by the adjacent panels. In most applications, the interconnection of the panels gives the wall sufficient load bearing characteristics. If, however, additional load bearing strength is required in the constructed wall using the panels 20, a metal reinforcing element 40 may be incorporated at the connection. One such example is illustrated in FIG. 6 where the beam is formed from roll formed metal sheet 41 and incorporates oppositely disposed channels 42 and 43 which are arranged to interfit between the engaging projections and recesses (32 and 34) of the adjacent panels $20^i$ and $20^{ii}$. The reinforcing element 40 substantially improves the load bearing characteristics of the wall as, by virtue of its configuration and its engagement with the adjacent panels, it is able to accommodate substantial compressive loading.

Figure 7:
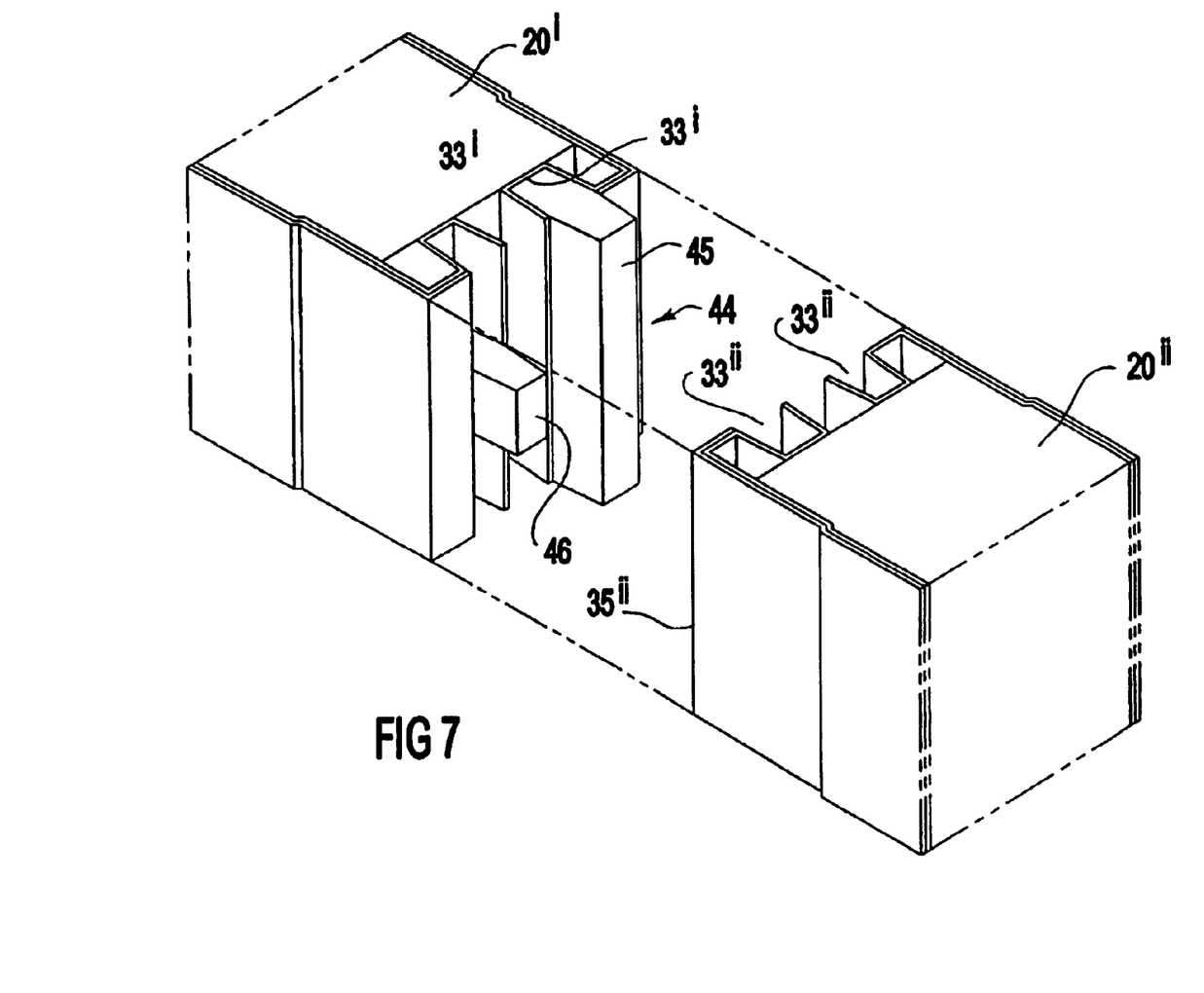
FIG. 7 illustrates a variation of the panel of FIG. 3 and its connection with a like panel.

FIG. 7 illustrates a variation of the coupling arrangement between adjacent panels $20^i$ and $20^{ii}$. In this arrangement both the longitudinal edge regions 24 and 25 incorporate a pair of recesses 33. As illustrated in FIG. 7 in connecting the panel $20^i$ to like panel $20^{ii}$, the recesses $33^i$, $33^{ii}$ of the respective panels are arranged to be aligned and inserts 44 are located within the cavity formed between the aligned recesses to couple the panels together. The inserts may be of any suitable form and may include a continuous strip 45 which extends over the majority of the length of the connected panels, or may be in the form of smaller wedges 46 which extends over only a portion of the length of the panels.

Figure 8:
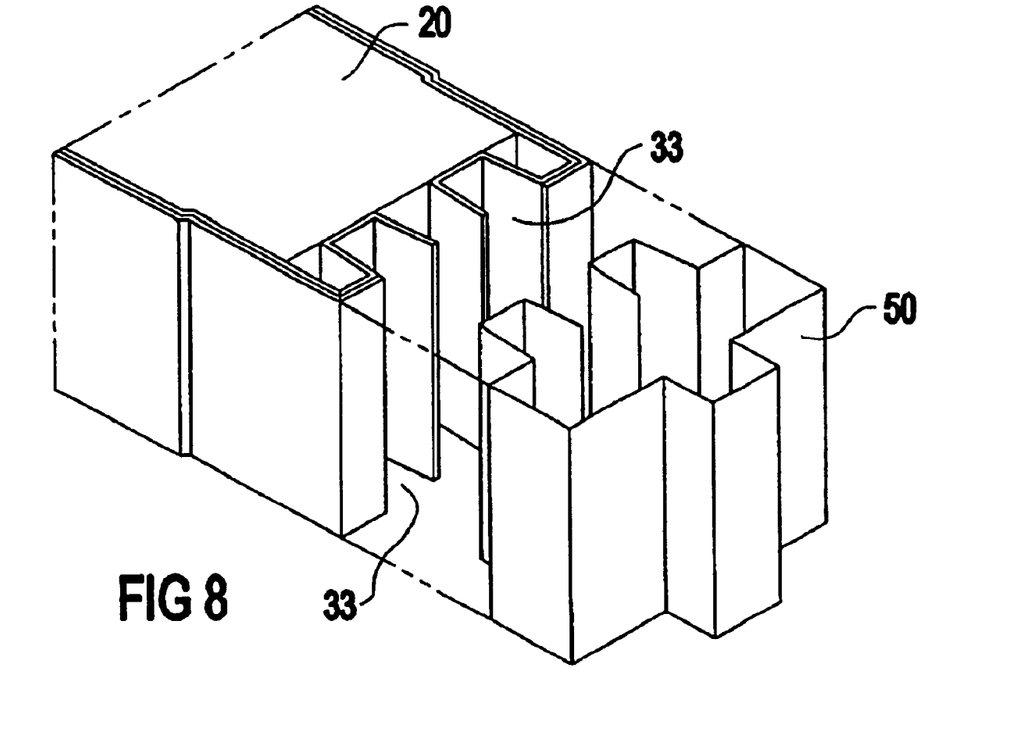
FIG. 8 is a partial perspective view illustrating the connection of an end trim component to the panel of FIG. 7.

FIG. 8 illustrates a specially formed edge strip 50 which is arranged to be coupled to the longitudinal edge region 24 or 25 of the panel 20. The edge strip 50 may be solely as a decorative end strip or may have a functional purpose such as form part of a door frame assembly as in the illustrated embodiment where the strip 50 is configured to form a door jamb.

Figure 10:
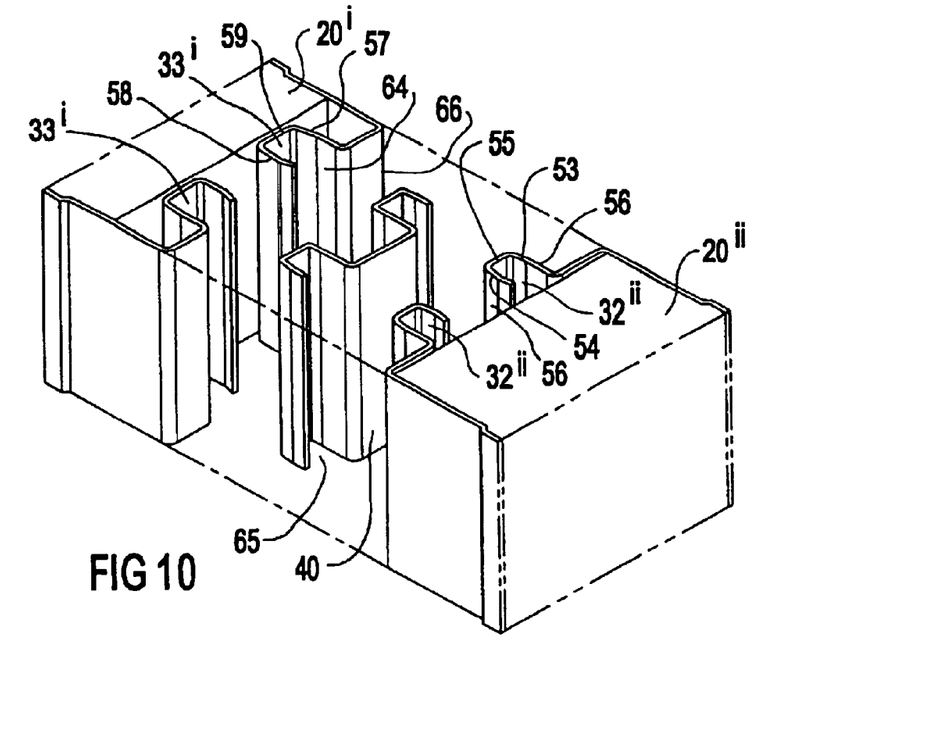
FIG. 10 is a perspective view illustrating the connection of a variation of the panel of FIG. 3 with a like panel and including an intermediate reinforcing element.

FIG. 10 illustrates a further variation of the panel 20. This panel includes many similar features to the earlier embodiments and accordingly like reference numerals have been given to like features. In a similar arrangement to the previous embodiments, the panel 20 includes longitudinal edge regions 24, 25 which are profiled to enable the panel 20 to interlock with a like panel. A reinforcing element 40 is also arranged to interfit at the joint between adjacent panels.

In the illustrated form, the longitudinal edge region 24 provides a pair of recesses or female couplings 33 whereas the edge regions 25 provide a pair of male couplings or projections 32. It is to be appreciated that if desired, each edge region could include both a male and female coupling similar to that illustrated in FIG. 3.

In the embodiment of FIG. 10, the profiles have been specifically designed to give the panel enhanced load bearing characteristics at its joint with an adjacent panel. The male and female couplings are shaped to provide generally a part box section which interlocks with a snap fit action. This arrangement has the advantage that the box section provides good load bearing characteristics and the snap fit action draws the interlocking members together. This inhibits inadvertent separation of the members and also enables the interlocking panels to act as a single unit thereby enhancing the panels overall load bearing capabilities at this connection.

The male coupling 32 includes opposite walls 53 and 54 which are interconnected by a base portion 55. To provide the snap fit, the walls 53 and 54 are not linear but rather includes outwardly extending crests 56 intermediate the ends of the respective walls 53, 54. The female coupling 33 incorporates a complimentary shaped recess. Specifically, the female coupling 33 incorporates opposite walls 57, 58 which are interconnected by base portion 59 and which incorporate re-entrant portions 64 on their inner surface. In use, on interconnecting the panels together the male and female couplings are caused to flex through engagement of the male coupling walls 53, 54 with the female coupling walls 57, 58. The flexing continues until the crests 56 begin to align with the re-entrant surfaces 64 whereafter the couplings begin to return to their natural state as the crests move into alignment with the reentrant surfaces 64. Once in alignment, the resilience of the couplings inhibits the release of the two interconnected members.

The positive or snap fit between the male and female couplings occurs whether or not the reinforcing element 40 is incorporated. The profile of the reinforcing element 40 has inner surfaces 65 which matches that of the female couplings 33 and an outer surface 66 which matches that of the male coupling 32. As a result, the reinforcing element 40 is able to snap fit into connection with the female couplings $33^i$ of a first panel $20^i$. Once in place, the male couplings $32^{ii}$ of the like panel $20^{ii}$ is then able to locate into engagement with the inner surface 65 of the connected reinforcing element 40.

Figure 11:
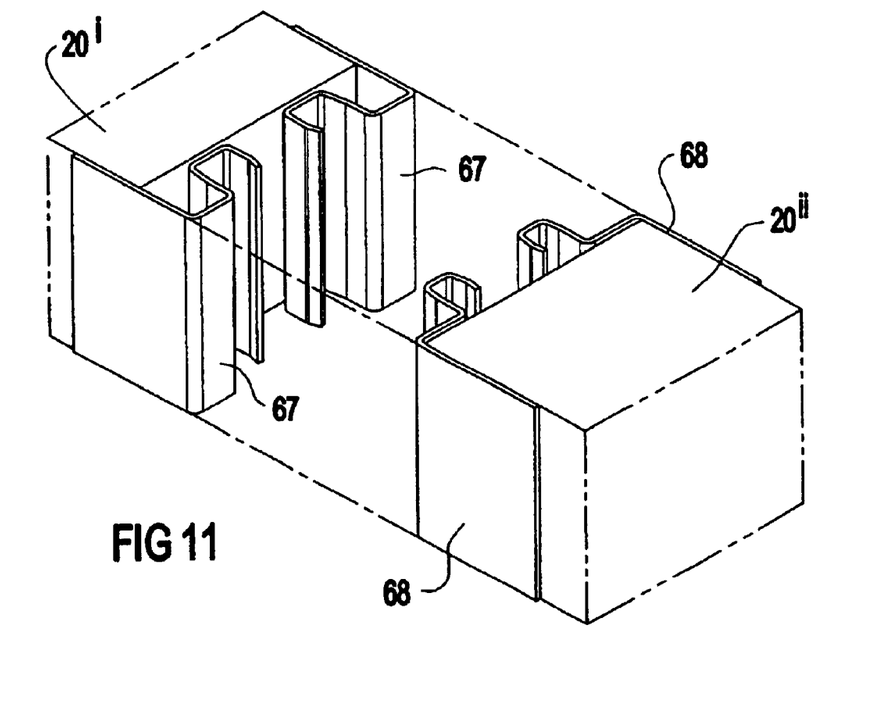
FIG. 11 illustrates a variation of the panel of FIG. 3 incorporate separately formed longitudinal edge profiles.

FIG. 11 illustrates a similar view to that illustrated in FIG. 10 except that the edge profiles 24,25 are formed separately to the panel 20. In this arrangement the edge profiles 67, 68 are similar to the edge strip 50 are formed from a folded metal sheet and are secured to the edge margins of the panels using any suitable fastening arrangements such as by screw, adhesive or the like. These edge profiles 67, 68 enable the system to be used with a panel 20 having a straight edge and may be used when it is required to cut the structural panel or when the structural panel is required to interfit with conventional panels or other building materials.

The composite panel 20 incorporating the profiled edges and the internal reinforcing element 40 may be advantageously used in many aspects of building constructions including in interior as well as exterior wall structures, or in flooring or ceiling systems. Further, the choice of the surface materials used to form the outer faces 38, 39 of the panel will depend on the application of the panel. For example, if the panel is to be used as an internal partition wall, then the paper covering may be laminated to the metal substrate as described earlier so that the panel has a surface characteristic which is similar to that of plasterboard. Alternatively, the outer face of the panel may be exposed metal, such as stainless steel, which is suitable for use in operating theatres or the like. In this example, to reduce material cost, the stainless steel may be applied as a laminate to the metal substrate of the panel 20 or alternatively the substrate may be formed from solid stainless steel. It is to be appreciated that other surface configurations could be used as will be appreciated by those skilled in the art.

Figure 12:
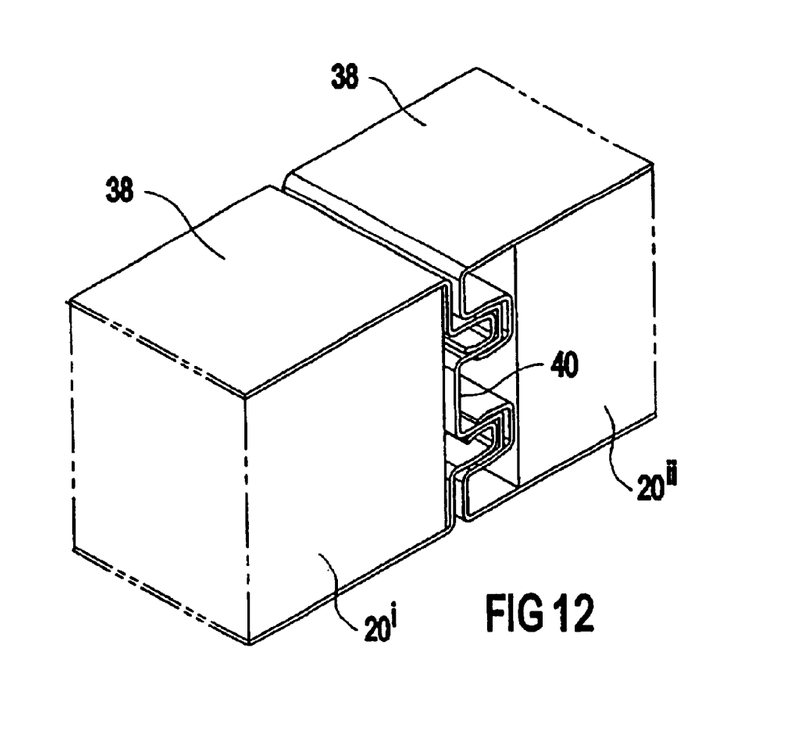
FIG. 12 is a partial perspective view illustrating the panel of FIG. 10 when used as a flooring system.

FIG. 12 illustrates a further variation of the panel when used as part of a flooring system. In this arrangement the reinforcing element 40 acts as an internal bearer thereby providing the required loading characteristics for the flooring system. In this arrangement the upper face 38 incorporates a timber veneer so as to give the impression of a timber floor.

Figure 13:
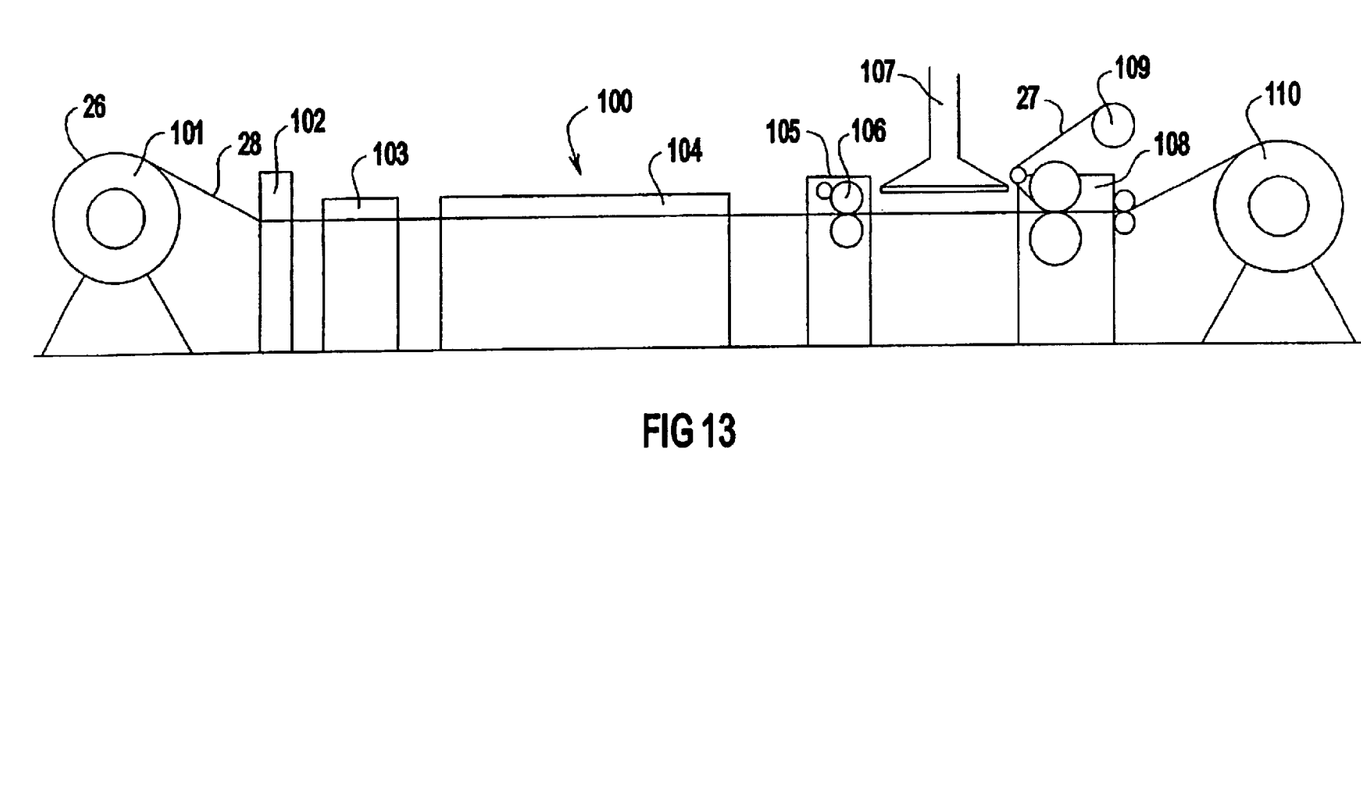
FIG. 13 is a line diagram of a laminating process for use in the production of a building panel.

FIG. 13 illustrates a line diagram of a laminating process used to bond the paper covering to the metal substrate for use in the building panel of the invention.

In this process, the metal feed stock 26 which is typically galvanised steel but may be any other sheet metal, is fed from an uncoiler 101 into the process line 100. The sheet metal is then correctly positioned by running through an edge guide 102 and then subsequently through a straightener 103. The sheet metal then passes through a cleaning and heating unit to remove any debris on the metal surface and to bring the temperature up to a predetermined level. The exact temperature range used is dependent on the characteristics of the adhesive being applied but is typically in the range of 20 to 50° C. The sheet metal then passes through to an adhesive coater 105 which incorporates a roller 106 which comes into contact with the upper surface 28 of metal substrate 26 so as to apply a thin film to the metal sheet. The adhesive is a reactive hot melt polyurethane and is typically applied at a temperature in the range of typically 110 to 140° C. with a coating being applied to the metal surface in the order of 10–20 microns in thickness.

After the adhesive has been applied, the metal sheet 26 then passes through a humidifier 107 which further conditions the adhesive coating on the metal surface 28. The sheet then passes to a laminator 108 where the paper 27 which is stored in a coil 109 is applied under tension to the surface 28 of the metal 26. The laminated product is then fed to a recoiler wherein it is stored in rolls ready for transporting (as illustrated) or to a further production station. The station further processes the metal panel and may include a roll forming station to form the edge profiles, a sheering station to form the panel into sheet form or to slit the metal panel so as to alter the panel width. To make the integrated composite building panel 20, the laminated metal sheet is fed to separate laminating process to form the panel 20 with its sandwich construction.

An advantage of the panel of the present invention is that the paper laminated metal sheet is inexpensive to manufacture as it can be made using the laminating process without requiring any pretreatment, such as painting of the metal substrate. This has substantial practical benefit as it enables the building panel formed from the metal substrate to be extremely competitive in price with traditional plasterboard panels. Furthermore by making the building panel using the composite material of a metal sheet substrate and a paper covering, the panel of the invention can be used in conjunction with plasterboard panels, as it has a surface characteristic which can match that of plasterboard, yet has the additional advantages in that it can be load bearing, can be formed or otherwise shaped into complex configurations, including being able to have profiled edges to enable the panel to be interlocked with a like panel and can be designed to have improved thermal and acoustic insulation characteristics.

Finally it is to be understood that modifications and or additions may be made to the parts as previously described without departing from the spirit or ambit of the invention.

What is claimed is:

1. A building panel of sandwich construction comprising a core and spaced metal sheets fixed to opposite major faces of said core, said core including opposite end edges which extend between said opposite major faces thereof, said panel having opposite major surfaces and opposite longitudinal edge regions, each of said metal sheets comprising opposite edge regions which form the longitudinal edge regions of the panel and which extend inwardly of said opposite major surfaces of said panel to form a pair of connecting elements at each edge region of the panel, said connecting elements extending across the end edges of said core and being formed as either a channel or a projection, the connecting elements of the longitudinal edge regions of the panel being adapted to interfit with the connecting elements of a respective one of the longitudinal edge regions of another panel to provide for interconnection of the panel with another panel and to form a load bearing region capable of accommodating loading applied to the interconnected panels, wherein at least one of said metal sheets has a paper covering bonded thereto so that said metal sheet forms one of the major surfaces of the panel, wherein the paper covering provides a surface characteristic that enables said major surfaces of the panel to be finished to appear continuous by using finishing techniques, wherein the panel is configured such that the major surfaces of the interconnected panels incorporating the paper covering are aligned and in substantially abutting relationship to form a continuous surface, wherein said finishing techniques are applied to the major surfaces of the interconnected panels.

2. A building panel according to claim 1, further comprising a generally planar abutment surface at each longitudinal edge region, the abutment surface extending generally perpendicular to said major surfaces of said panel and wherein the connecting elements are disposed inwardly of the at least one major surface of the panel having the paper covering with said abutment surfaces being disposed between said major surface and said connecting elements, wherein the paper covering gives the panel a surface characteristic which is substantially the same as a plasterboard panel and wherein, in use, the panel is operative to form an exposed surface by connection of the panel with another panel through interfitting of respective ones of the connecting elements, or by abutment of an edge of a plasterboard panel against a respective one of said abutment surfaces.

3. A building panel according to claim 1, wherein said channel is generally C shaped in cross section incorporating opposite walls interconnected by a substantially flat base portion.

4. A building panel according to claim 3, wherein the angle between the opposite walls and the base portion is approximately 90° so that the channel forms a part box section.

5. A building panel according to claim 1, wherein the projection interfits in nesting engagement within the channel of said another panel.

6. A building panel according to claim 1, wherein the projection has an outer surface which is complementary to the inner surface of the channel so that on interconnection of the panels, the projection is in engagement with substantially all of the inner surface of the channel of said another panel.

7. A building panel according to claim 1, wherein the projection is operative to interfit with a channel of said another panel in a snap fit arrangement.

8. A building panel of sandwich construction comprising a core and spaced metal sheets fixed to opposite major faces of said core, said core including opposite end edges which extend between said opposite major faces thereof, said panel having opposite major surfaces and opposite longitudinal edge regions, each of said metal sheets comprising opposite edge regions which form the longitudinal edge regions of the panel and which extend inwardly of said opposite major surfaces of said panel to form a pair of connecting elements at each edge region of the panel, said connecting elements extending across the end edges of said core and being formed as either a channel or a projection, the connecting elements of the longitudinal edge regions of the panel being adapted to interfit with the connecting elements of a respective one of the longitudinal edge regions of another panel to provide for interconnection of the panel with another panel and to form a load bearing region capable of accommodating loading applied to the interconnected panels, wherein at least one of said metal sheets has a paper covering bonded thereto so that said metal sheet forms one of the major surfaces of the panel, wherein the paper covering provides a surface characteristic that enables said major surfaces of the panel to be finished to appear continuous by using finishing techniques, wherein the panel is configured such that the major surfaces of the interconnected panels incorporating the paper covering are aligned and in substantially abutting relationship to form a continuous surface, wherein said finishing techniques are applied to the major surfaces of the interconnected panels, wherein the projection is operative to interfit with a channel of said another panel in a snap fit arrangement, wherein the channel includes a re-entrant portion on its inner surface, and wherein the projection includes a crest portion on its outer surface and wherein the crest portion on the projection of one panel is arranged to engage with the re-entrant portion of the channel of said another panel in a snap fit arrangement.

9. A building panel according to claim 1, wherein the edge region of the major surface of the panel incorporates a recess to facilitate concealment of a joint between the panel and said another panel by using finishing techniques.

10. A building panel according to claim 1, wherein said paper is bonded to said substrate using a reactive hot melt adhesive.

11. A building panel according to claim 1, wherein said paper is bonded directly onto said metal substrate.

12. A building panel according to claim 1, wherein the metal, substrate is selected from the group consisting of mild steel, aluminum, tin, stainless steel, and galvanized steel.

13. A building panel according to claim 1, wherein the gauge of the metal substrate is between 0.3 to 1 mm.

14. A building system including a building panel and a separate reinforcing element, the building panel comprising a core and having spaced metal sheets fixed to opposite major faces of said core, said core including opposite end edges which extend between said opposite major faces thereof, said panel having opposite major surfaces and longitudinal edge regions, said metal sheets including opposite edge regions which form longitudinal edge regions of the panel, wherein said edge regions extend inwardly of said opposite major surfaces of said panel and across each end edge of said core to provide for interconnection of the panel with another panel and to form a load bearing region capable of accommodating loading applied to interconnected panels, and each edge region of the panel is profiled to form a pair of connecting elements which extend across the end edges of said core, the connecting elements of the longitudinal edge regions of the panel being adapted to interfit with the connecting element of a respective one of the longitudinal edge regions of another panel, each connecting element being formed as either a channel or a projection which cooperate to interfit, each channel incorporating opposite walls interconnected by a substantially flat base portion, and wherein each projection is shaped to interfit with the channel of said another panel and includes opposite walls interconnected by a substantially flat bridging portion, the panel being configured such that the major surfaces of the interconnected panels are aligned and in substantially abutting relationship to form a substantially continuous surface and wherein the reinforcing element is operative to be installed at a joint formed on connection of the panel with said another panel and is secured in place by locating said reinforcing element between and in connection with the interfitting connecting elements of each panel to conceal the reinforcing element which is operative to improve the load bearing characteristics of the interconnected panels and wherein said reinforcing element includes at least one engagement part which is generally U-shaped and located between said interfitting channel and projection of the interconnected panels.

15. A building system according to claim 14, wherein the reinforcing element includes spaced apart engagement parts interconnected by a web.

16. A building system according to claim 14, wherein the angle between the opposite walls of each channel and the base portion is approximately 90° to form a part box section.

17. A building system according to claim 14, wherein the angle between the opposite walls of each projection and the bridging portion is approximately 90° to form a part box section.

18. A building system according to claim 14, wherein the opposite walls of each channel include a re-entrant inner surface, and wherein the outer surface of the opposite walls of each projection include a crest and wherein the crest portion on the projection of one panel is arranged to engage with the re-entrant inner portion of the channel of said another panel in a snap fit arrangement.

19. A building system according to claim 14, wherein the connecting elements are adapted to interfit with the connecting elements of said another panel and with the reinforcing elements in a snap fit arrangement.

20. A building system according to claim 14, wherein the building panel further includes at least one abutment surface at each longitudinal edge region, the at least one abutment surface extending generally perpendicular to said major surfaces of said panel and is disposed between a respective one of the major surfaces and said connecting elements.

21. A building system according to claim 14, wherein a paper covering is bonded to at least one of the metal sheets so that said paper covered metal sheet forms one of the major surfaces of the panel.

22. A building system according to claim 21, wherein said paper is bonded to said metal sheet using a reactive hot metal adhesive.

23. A building system according to claim 21, wherein said paper is bonded directly onto said metal sheet.

24. A building system according to claim 21, wherein the metal sheet incorporating the paper covering is formed in continuous lengths using a laminating process to adhere the paper covering to said metal sheet.

25. A building panel comprising a metal sheet substrate and a paper covering bonded to said substrate, wherein said paper covered metal sheet forms a major surface of the panel with the paper covering providing a surface characteristic to that major surface that is structured to be finished using conventional finishing techniques, and wherein said metal sheet includes opposite edges which are shaped to form edge regions of the panel, each edge region being formed to include a connecting element which extends along that edge region and which allows for interconnection of the panel with another panel, and wherein when interconnected, the major surfaces of the interconnected panels are aligned and in substantially abutting relationship to enable a continuous surface to be obtained on applying the conventional finishing techniques to the paper covered major surfaces of the interconnected panels.

26. A building panel according to claim 25, wherein one connecting element is formed as a channel and the other formed as a projection, the projection at one edge region being configured to interfit within the channel of the other edge region of said another panel to form to a load bearing region capable of accommodating loading applied to the interconnected panels.

27. A building panel according to claim 8, wherein the connecting elements of the panel are sufficiently resilient so that the projection and channel are drawn into engagement on interconnecting of the panel with another panel in the snap fit arrangement through interengagement of the crest and re-entrant portions.

28. A method of building a partition having a continuous surface comprising the steps of:

providing a plurality of panels, each panel comprising a metal sheet substrate and a paper covering bonded to said substrate, said paper covered metal sheet forming a major surface of the panel with the paper covering providing a surface characteristic to that major surface that is structured to be finished using conventional finishing techniques;

interconnecting the panels so that the major surfaces of the interconnected panels are aligned and in substantially abutting relationship; and applying the finishing techniques to the paper covered major surfaces of the interconnected panels to form a continuous surface across the interconnected panels.

29. A method according to claim 28, further comprising the step of:

forming a load bearing region at the joint between the interconnected panels, the load bearing region being capable of accommodating loading applied to the interconnected panels.

30. A method according to claim 29, further comprising the step of:

locating a reinforcing element within the joint between adjacent panels to increase the load bearing capacity of the load bearing region.

31. A method according to claim 28, wherein the panels are interconnected by interfitting of a projection formed on one panel within a channel formed in the other panel.

32. A method according to claim 28, wherein plaster based finishing techniques are applied to the interconnected panels to form the continuous surface.

* * * * *